US012032953B2

(12) United States Patent
Rathinagiri et al.

(10) Patent No.: US 12,032,953 B2
(45) Date of Patent: Jul. 9, 2024

(54) TECHNIQUES FOR PATCHING IN A DISTRIBUTED COMPUTING SYSTEM

(71) Applicant: VMware LLC, Palo Alto, CA (US)

(72) Inventors: Prabhakaran Rathinagiri, Bangalore (IN); Varun Sharma, Prayagraj (IN); Nishant Shreshth, Bangalore (IN); Hasmukh Kumar, Bangalore (IN)

(73) Assignee: VMware LLC, Palo Alto, CA (US)

( * ) Notice: Subject to any disclaimer, the term of this patent is extended or adjusted under 35 U.S.C. 154(b) by 86 days.

(21) Appl. No.: 17/697,017

(22) Filed: Mar. 17, 2022

(65) Prior Publication Data
US 2023/0229430 A1    Jul. 20, 2023

(30) Foreign Application Priority Data
Jan. 17, 2022 (IN) .............................. 202241002715

(51) Int. Cl.
*G06F 8/658* (2018.01)
*G06F 8/656* (2018.01)
*G06F 9/455* (2018.01)

(52) U.S. Cl.
CPC .............. *G06F 8/658* (2018.02); *G06F 8/656* (2018.02); *G06F 9/45558* (2013.01); *G06F 2009/4557* (2013.01); *G06F 2009/45595* (2013.01)

(58) Field of Classification Search
CPC ............. G06F 8/60–66; G06F 9/45558; G06F 2009/4557; G06F 2009/45595
(Continued)

(56) References Cited

U.S. PATENT DOCUMENTS

2006/0059481 A1* 3/2006 Smith ....................... G06F 8/65
717/173
2007/0106980 A1* 5/2007 Felts ................... G06F 9/44536
717/124
(Continued)

FOREIGN PATENT DOCUMENTS

WO    WO-9632679 A1 * 10/1996 ............... G06F 8/65

OTHER PUBLICATIONS

Russinovich, Mark, et al., Virtual Machine Preserving Host Updates for Zero Day Patching in Public Cloud, EuroSys '21: Proceedings of the Sixteenth European Conference on Computer Systems, Apr. 2021, 16 pages, [retrieved on Feb. 27, 2024], Retrieved from the Internet: <URL:http://dl.acm.org/>.*
(Continued)

*Primary Examiner* — Geoffrey R St Leger
(74) *Attorney, Agent, or Firm* — Quarles & Brady LLP

(57) ABSTRACT

A system may include multiple software components of a software application running on multiple nodes in a distributed computing system, a patch execution server including a patch build server including a structured patch execution module connected to the distributed computing system via a network. The patch execution module receives an uploaded patch, a patch definition file, and a workflow template from a global patch repository. Further, the patch execution module creates a patch definition file for the patch using an associated patch master file, an associated build definition file, and an associated product definition file. Furthermore, the patch execution module creates a workflow template using the patch definition file and the patch. Also, the patch execution module creates a workflow file using node information associated with the multiple nodes and the workflow template. In addition, the patch execution module executed the patch, using the patch, patch definition file and the
(Continued)

workflow file, across the multiple nodes in the distributed computing system.

21 Claims, 4 Drawing Sheets

(58) Field of Classification Search
USPC .................................................. 717/168–178
See application file for complete search history.

(56) References Cited

U.S. PATENT DOCUMENTS

| | | | |
|---|---|---|---|
| 2011/0138374 A1* | 6/2011 | Pal ........................... | G06F 8/656 |
| | | | 717/169 |
| 2014/0237463 A1* | 8/2014 | Sriram ...................... | G06F 8/65 |
| | | | 717/172 |
| 2023/0185559 A1* | 6/2023 | Landman .................. | G06F 8/65 |
| | | | 717/171 |

OTHER PUBLICATIONS

Chen, Ping, et al., CloudER: A Framework for Automatic Software Vulnerability Location and Patching in the Cloud, ASIACCS '12: Proceedings of the 7th ACM Symposium on Information, Computer and Communications Security, May 2012, 5 pages, [retrieved on Feb. 27, 2024], Retrieved from the Internet: <URL:http://dl.acm.org/>.*

* cited by examiner

TECHNIQUES FOR PATCHING IN A DISTRIBUTED COMPUTING SYSTEM

RELATED APPLICATION

Benefit is claimed under 35 U.S.C. 119(a)-(d) to Foreign Application Serial No. 202241002715 filed in India entitled "TECHNIQUES FOR PATCHING IN A DISTRIBUTED COMPUTING SYSTEM", on Jan. 17, 2022, by VMware, Inc., which is herein incorporated in its entirety by reference for all purposes.

TECHNICAL FIELD

The present disclosure relates to patching, i.e., software updates, and more particularly to methods, techniques, and systems for patching in distributed computing systems.

BACKGROUND

Patching is a process of modifying already-installed software applications. Patching can be useful to modify software applications for a variety of purposes, including correcting a programming error, reducing, or eliminating a security risk, improving the logic used by the modified software application and so on. In a production scenario, any errors in patching may not be tolerable as all the information such as configuration, application data might be lost and may bring the system to an unstable state. Therefore, installation and removal of a patch is important for an administrator. Typically, administrators are unaware of internal constructs of a software application, and this can result in an erroneous installation of a patch.

Generally, distributed computing systems consist of multiple software components that are on multiple nodes (typically, virtual machines (VMs)), but run on a single system, working together to complete a task. Basically, it's a distributed software application running on multiple nodes to execute a given task. The computers that are in a distributed computing system can be physically close together and connected by a local network, or they can be geographically distant and connected by a wide area network, A distributed computing system can consist of any number of possible configurations, such as mainframes, personal computers, workstations, minicomputers, VMs, containers and so on. The goal of distributed computing system is to make such a network work as a single computer. The system can easily be expanded by adding more machines (physical, e.g., computer and/or virtual) as needed. More than one machine can provide the same services, so if one is unavailable, backup machines ensure work does not stop.

Distributed computing systems can run on hardware that is provided by many vendors and can use a variety of standards-based software components. Such systems can be independent of the underlying software. They can run on various operating systems and can use various communications protocols. Some hardware might use UNIX or Linux as the operating system, while other hardware might use Windows operating systems. For intermachine communications, this hardware can use systems network architecture (SNA) or transmission control protocol/Internet protocol (TCP/IP) on Ethernet or Token Ring.

Currently, patching in a distributed computing system is generally performed manually by an administrator based on instructions given in the form of knowledge base. The administer installs the patch manually by stopping and restarting the services. In some instances, some automation may be associated with the patching, i.e., a universal patch installer may remove the execution file and replace with a new patch file. Existing patching methodologies are error prone and may cause production downtime and data loss in the distributed computing system.

In such a distributed computing system, patching becomes complicated and error prone as the patching may need to be done in some or all the nodes in a specific sequence instructed by a developer. In such a scenario, patching may become even more difficult and error prone as the internal constructs of the software components in the distributed computing system may not be known to an administrator.

Figure 1:
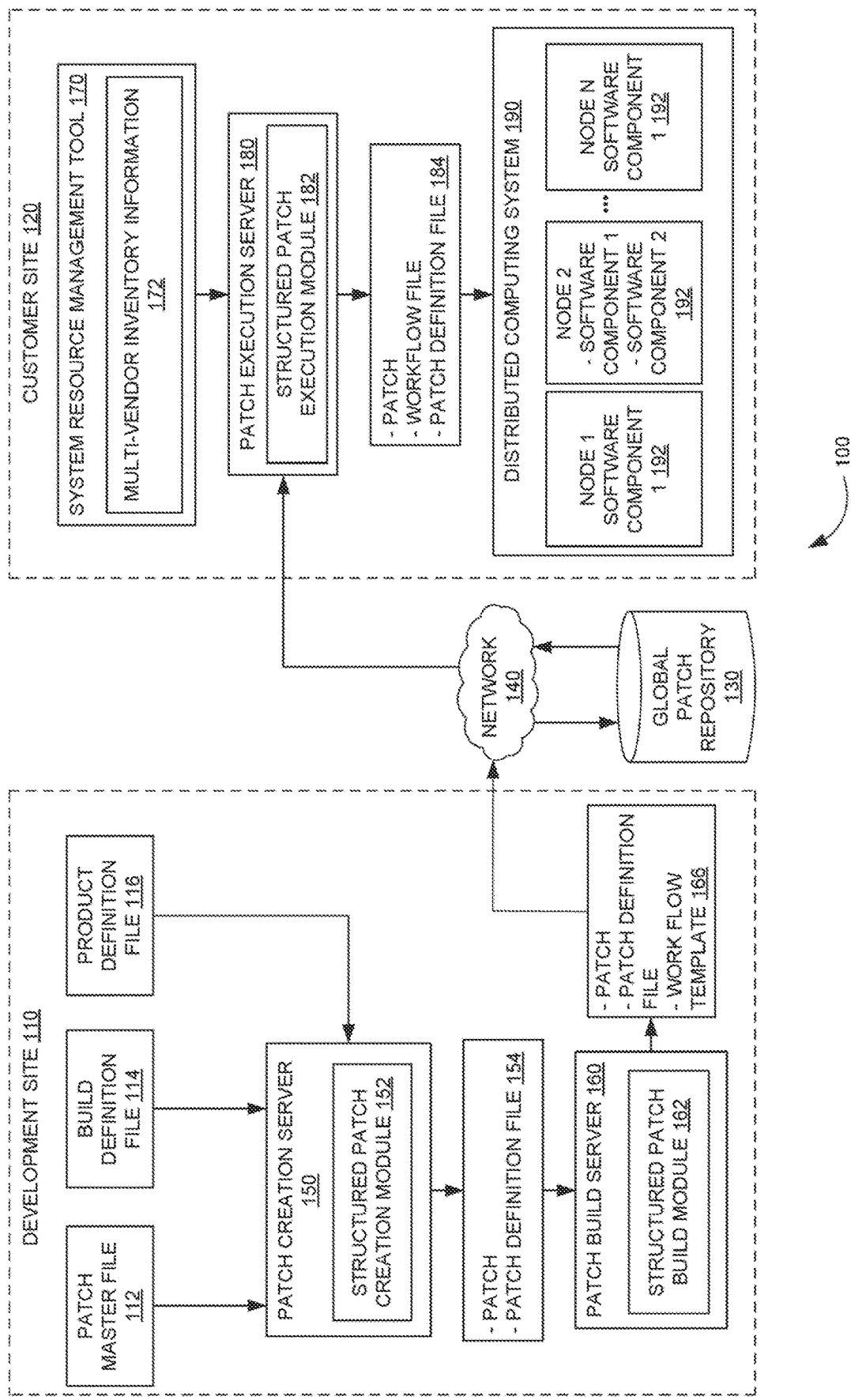
FIG. 1 is a system for patching in a distributed computing environment.

The drawings described herein are for illustration purposes only and are not intended to limit the scope of the present subject matter in any way.

DETAILED DESCRIPTION

Typically, in a distributed computing system, a software application may be running on multiple nodes (VMs) to complete a task. Generally, patching in such a distributed computing system can be complex and error prone as an administrator may not be aware of all the internal constructs of the software components requiring the patching.

Patch creation is a process of creating patch for any product or products. To create a patch, we may need to have actual fix to be built and ready to be delivered, such as war, ear, jar, script file and so on. Once patch files are created and configured, patch information may be sent to a patch builder, where it may be compiled and uploaded to a global patch repository. Some patches may have dependencies on exiting patches in the global patch repository, in such cases, the patch builder may download those patches to a patch builder server for compiling.

Generally, patches are created at a development site, where a developer may use a universal patching tool to create a patch. Typically, the patch creation tool takes the product definition file and provides options to the developer for selecting or deselecting software components, nodes, artifacts to be part of the patching. Once a patch is created; the patch is pushed to a repository. In the next phase, patch execution is performed at a customer site as the patch is available in the repository, which the customer can take and execute, typically, using a patch execution server.

In the following paragraphs, details are set forth that lay out techniques for defining a patch, product, software components, and nodes in a structed format for a distributed computing system. Once a patch is defined, a patch definition file is created along with binaries required for a hot fix and actions to be performed to complete the patch without requiring a manual intervention. Thus, making the patching less complex, more efficient and less error prone in the distributed computing system.

Further in the following paragraphs, details are set forth that recite the techniques of separating the artifacts, components, products, nodes, and their corresponding permitted actions at a development time that provides a patching ability without much effort and hot patching becomes easier task in a distributed application at a customer site. Following techniques recite an automated patching process, and, typically, an end user just needs to select which nodes need to be patched or even abstracted which machine/host/application should be patched. Further, the technique describes how an end user need not need to manually patch, start, and stop services as the patching process is automated, which avoids human errors as well. In addition, if a patching fails during execution due to network or some other disruption, patching can be easily reversed and retried by a reversal patch process.

The terms "nodes" and "VMs" are used interchangeably throughout the document. In addition, the terms "server" and "physical hosts" are used interchangeably throughout the document. Also, the terms "distributed computing", "distributed system", "distributed computing environment", and "distributed computing system" is used interchangeably throughout the document. Further, the terms "software application", "software product", and "product" are used interchangeably throughout the document. Furthermore, the terms "component" and "software component" are used interchangeably throughout the document.

In the following description, for purposes of explanation, numerous specific details are set forth to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1 is a block diagram of an example patching system 100. Example patching system 100 may be in a virtualized computing environment (VCI) or a cloud computing environment. Further, example patch creation system 100 may include a virtual datacenter. The virtual datacenter may be a pool or collection of cloud infrastructure resources designed for enterprise needs. Furthermore, the virtual data center may be a virtual representation of a physical data center, complete with servers, storage clusters and networking components, all of which may reside in virtual space being hosted by one or more physical data centers. Also, each datacenter may include multiple host computers.

As shown in FIG. 1, patching system 100 for a distributed computing system 190 may include a development site 110 and a customer site 120. Also as shown in FIG. 1 a patch creation server 150 and a patch build server 160 that are communicatively coupled to each other are typically located in the development site 110. Further, as shown in FIG. 1, the patch creation server 150 may include a structured patch creation module 152. Furthermore, as shown in FIG. 1, the patch build server 160 may include a structured patch build module 162.

In addition, as shown in FIG. 1, the patching system 100 may include a system resource management tool 170 including a multivendor inventory information 172 at the customer site 120. Example multi-vendor invention information may include node information associated with the multiple nodes 1-N 192 in the distributed computing system 190. Example node information may include details of how the multiple nodes 1-N 192 are coupled and how or what software components are running on the multiple nodes 1-N 192. Also, as shown in FIG.1, the system resource management tool 170 is coupled to the patch execution server 180.

Also as shown in FIG. 1, the patching system 100 includes a patch execution server 180 including a patch execution module 182 that is communicatively coupled to the system resource management tool 170 at the customer site 120. Further, as shown in FIG. 1, the patch execution server 180 is communicatively coupled to the distributed computing system 190 at the customer site 120.

Furthermore, as shown in FIG. 1, the patching system 100 may include a global patch repository 130 that is communicatively coupled via a network 140 to the patch build server 160 residing at the development site 110 and the patch execution server 180 residing at a customer site 120. In one example, the global patch repository 130 may contain all the patches created to date. Typically, customers having a software application may have access to associated patches in the global patch repository 130.

Example network 140 can be a managed Internet protocol (IP) network administered by a service provider. For example, the network140 may be implemented using wireless protocols and technologies, such as Wi-Fi, WiMAX, and the like. In other examples, the network 140 can also be a packet-switched network, such as a local area network (LAN) wide area network (WAN), metropolitan area network (MAN), Internet network, or other similar type of network environment. In yet other examples, the network 140 may be a fixed wireless network, a wireless LAN, a wireless WAN, a personal area network (PAN), Intranet or other suitable network system and includes equipment for receiving and transmitting signals.

Furthermore, the patching system 100 may include a distributed computing system 190 that is communicatively coupled to the patch execution server 180. As shown in FIG. 1, the distributed computing system 190 may include multiple nodes 1-N 192, Further as shown in FIG. 1, multiple software components of a software application may run on the multiple nodes 1-N 192. Example nodes are mainframes, personal computers, workstations, minicomputers, virtual machines (VMs), and/or containers.

During operation, the structured patch creation module 152 creates a patch definition file154 for a patch to be executed on software components of a software application running in the distributed computing system 190 using a patch master file 112, an associated build definition file 114 and a product definition file 116. Example patch master file 112 includes default patches and their associated identification (id) information and checksums. The term "product definition file" refers to a "software application definition file". Also, the patch master file 112 may keep track of all delivered patches. Below is an example patch master file including default patches, associated ids and checksums:

```
{masterPatch": {
    "patchId": "d03923ab-b6ea—44d3-b8f6-72d97f1b43c3",
    "sha256Checksum": "2f502aa1e0a95c226038ddd024efd678cfac6d278bfd89aa9..."
},
```

```
"dependentPatches": [
    {
        "patchID": "d86fa778-7fe1-4cf2-b145-0e7f309a9854",
        "sha256Checksum": "50fde31c7bb422d023c26f585688d93764da54f822deb79a..."
    },
    {
        "patchID": "826ba28f-391d-4249-8024-8e8a5cc3c62f"
        "sha256Checksum": "5d4dbfc82ee715a653291fb987dd565b6fc567ffee828d9e..."
    },
    .
    .
    .
```

In one example, the build definition file 114 may build a patch using selected patches from the above master file 112. The selected patches may include binary information, such as metadata and the like. Example metadata may include product name, version of the software component/application, date the software component/application was created, and so on. Example build definition file114 may include binary information in the build and deployed environment, such as the distributed computing system 190.

In one example, the product definition file 116 includes binary information that defines the software components and associated artifacts. Further in an example, the product definition file 116 may include a list of permitted actions that can be performed on the artifacts. Example product definition file 116 is as shown below:

```
{
    "productName": "vRA-7.4-Patches",
    "productversion": "7.4.0.11932227"
    "masterPatch": {
        "patchID": "vRA-7.4.0.11932227-HF1"
        "checksum":
"1a278e88d61aa10ee46cbf5a75b4dBa13b32b3fedcaf885..."
        "version": "7.4.0.11932227"
        "createDate": 1487880701404'
    }
    "patches":
    {
        "patch10": "vRA-7.4.0.1192227-HF1-Reverse"
        "checksum":
"140158db04bf76c4936debd1bae3fe796f6f7a08ea4eba64..."
        "version": "7.4.0.11932227",
        "createDate": 1488973228211'
    },
```

Figure 2:
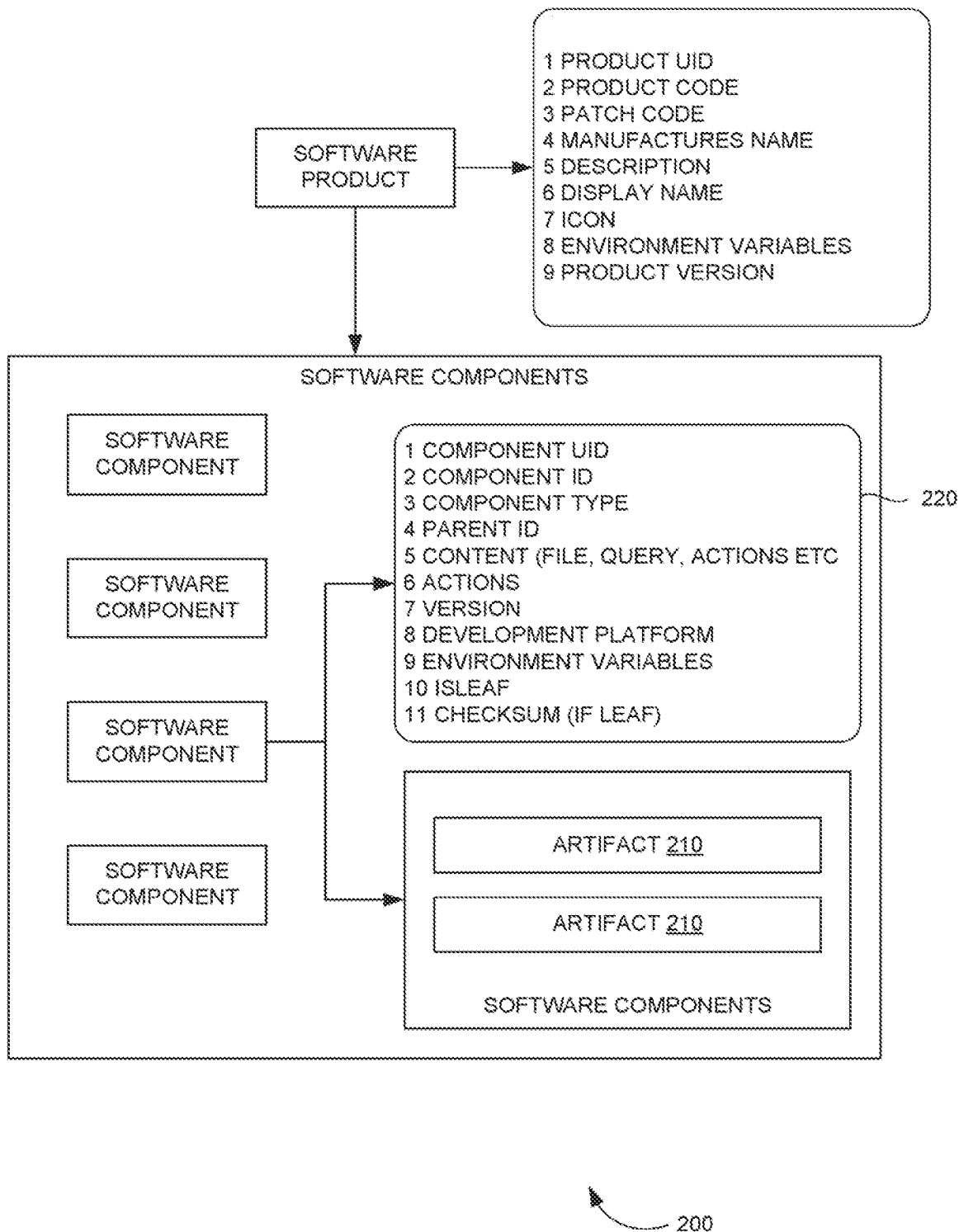
FIG. 2 is a block diagram of an example product definition architecture.

In one example, the product definition file 116 may include binary information in a deployed environment. Also, the product definition file 116 may be a subset of the build definition file 114 and may be sent with each patch. The production definition file 116 may be divided into software components, artifacts and may include scenarios, which are a list of permitted actions to be performed on the artifacts. The product definition file 116 may be unique to a product and may define the software component and artifact involved in the distributed computing system 190, which can be patched. The product definition file 116 may further include supported operations (actions) for a software component and its associated artifact. FIG. 2 shows an example product definition architecture. It can be seen in FIG. 2 that the product definition file 116 captures granularization 220 of product artifacts 210 and actions associated with it.

For example, an artifact may be extracted from "artifactSourcePath" and replaced in "artifactDestinationPath", after the actions that are referenced in the scenarios that would get executed for a specific context of entity, such as STOP-SERVICE, PASTE, START-SERVICE. The actions may be independent tasks which are written in a patch execution code. The artifact may provide all permissible actions for the artifact itself.

In one example, the created patch definition file 154 may define the software components and the artifacts involved in the patch. The product definition file 116 is like a global definition file which may define all entities in the distributed computing system 190, whereas the patch definition file 154 is specific to a current context or the patch. The patch definition file 154 may be like the product definition file 116 except that it may be defined only for concerned patches. The patch definition file 154 basically may contain less elements in comparison with a product definition. Generally, the patch definition file 154 is created during development in the context of a hot fix. Example patch definition file 154, may define the software components and artifacts associated with the patch. Below is an example patch definition file 154 showing the software components and the artifacts:

```
{
    "components"; }
{
    "artifacts"; }
    {
        "artifactdeliverableName": system.spatial.dll",
        "artifactdestinationPath": "",
        "artifactName": "system.spatial.dll",
        "artifactSHA256Checksum": "b34769a38cf27875910a489941aaf7acca...",
        "artifactSourcePath": vcac/components/iaas.net/build/src/www/Dynamic...",
        "artifactType": "File",
        "artifacts":[ ]
        "deploymentPlatformversion" : [ ]
        "identifier": 4ac9c0a3-f419-443c-b160-8443acfaa6be4",
        "includes": [ ],
        "instalDefinitionState": "REVERSE_ENGINEERED",
        "isLeaf": true,
        "parent" : "c18be245-37e8-448a-9fb8-dfa9a56a1f24",
```

```
"parentartifactID" : [ ]
"scenarios": [
  {
    "actions": [
      {
        "actionName": "STOP-SERVICE"
      },
      {
        "actionName": "PASTE"
      },
      {
        "actionName": "START-SERVICE"
      }
    ],
    "scenarioName": "PATCH"
  }
}
```

Further, during operation, the structured patch build module 162, builds a workflow template based on the created patch definition file 154. For example, workflow template is a blueprint of how the patching needs to be applied in a distributed computing system. This may include step definitions which can be later converted to a workflow file in the customer environment.

The structured patch build module 162 may then upload the patch and the patch definition file 154 along with the workflow template 166 to the global patch repository 130, which is then available at the customer site 120 for execution.

Furthermore, during operation, the structured patch execution module 182, residing at a customer site 120, may receive the uploaded patch, patch definition file and workflow template 166 from the global patch repository 130. The structured patch execution module 182 may then create a workflow file using the node information associated with the multiple nodes 1-N 192 and the workflow template. Example node information may include details of how the multiple nodes 1-N 192 are coupled and how or what software components are running on the multiple nodes 1-N 192. In one example, the workflow file may be created using deployed instance or node information that can be applied to patches. An integration plug-in may have to be created to facilitate conversion of inventory data structure (i.e., the multi-vendor inventory information) to the system resource management tool 170 so that the node information is available to the structured patch execution module 182.

Example workflow file defines steps of actions to be performed in a software component running on a specific node. Further example workflow file includes definition and the order in which the software components may have to be executed (like 'stop' should be executed before 'replace' and so on). Also, the workflow file may include which node in the multiple nodes 1-N 192 executes first and dependency between nodes in the multiple nodes 1-N 192 can also be defined using 'beforeNode'. Example workflow file may define steps of actions to be performed in a software application which may be running on a node or nodes in the multiple nodes 1-N 192.

The structured patch execution module 182 may then execute the path using the patch definition file and the workflow file across the multiple nodes 1-N 192 in the distributed computing system 190. Typically, a patch execution happens at the customer site 120. In one example, the structured patch execution module 182 may communicate with all the nodes to be patched in the multiple nodes 1-N 192 using a secured shell or small agent that may be running inside the nodes that may depend on the design of the software application running in the distributed computing system 190. In one example, the structured patch execution module 182 may orchestrate the patching by tracking the patches already installed in the multiple nodes 1-N 192 and removing them from the installed multiple nodes 1-N 192. In this example, the structured patch execution module 182 may read the patch definition file 154 and execute the actions defined across the multiple nodes 1-N 192 in the distributed computing system 190.

Figure 3:
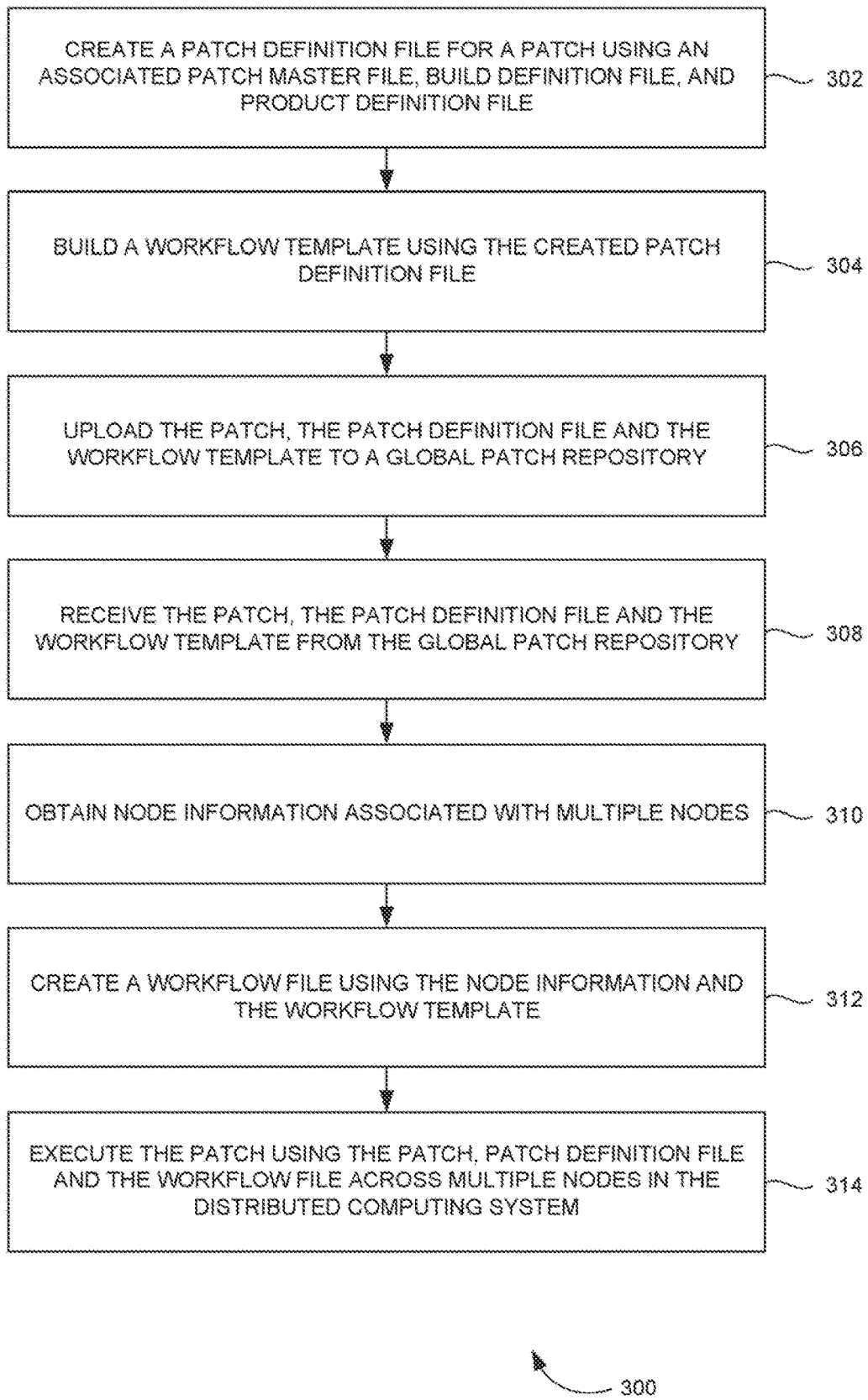
FIG. 3 is a flowchart illustrating an example method for patching in a distributed computing system.

FIG. 3 is a flowchart illustrating an example method 300 for patching in a distributed computing system. At 302, a patch definition file for a patch is created using an associated patch master file, a build definition file, and a product definition file. In one example, the patch master file includes default patches and their associated identification (id) information and checksums. The build definition file may include selected patches from the master file, wherein the selected patches comprise binary information, and wherein the binary information is metadata. The product definition file may include binary information that defines the software component and associated artifacts, and wherein the production definition file further comprises a list of permitted actions that can be performed on the artifacts.

At 304, a workflow template is built using the created patch definition file. At 206, the patch, the patch definition file and the workflow template are uploaded on to a global patch repository. Typically, actions 302-306 are performed at a development site.

At 308, the patch, the patch definition file and the workflow template are received at a customer site, such as a datacenter, from the global patch repository. St 310, node information associated with the multiple nodes in the distributed computing systems is obtained. At 312, a workflow file is created using the node information and the workflow template. At 314, the received patch is executed using the patch, the patch definition file, and the workflow file across multiple nodes in the distributed computing system. The patch definition file may define the software components and artifacts associated with the patch. The method 300 is described in more detail with reference to FIG. 1.

In an example, the method 300 depicted in FIG. 3, may represent generalized illustrations. Other processes may be added, or existing processes may be removed, modified, or rearranged without departing from the scope and spirit of the present application. In addition, the method 300, may represent instructions stored on a computer-readable storage medium that, when executed, may cause a processor to respond, for example, to perform actions, to change states, and/or to make decisions. The method 300, may represent functions and/or actions performed by functionally equivalent circuits like analog circuits, digital signal processing circuits, application specific integrated circuits (ASICs), or other hardware components associated with the system. Furthermore, method 300, is not intended to limit the implementation of the present application. Rather, example method 300, may illustrate functional information to design/fabricate circuits, generate machine-readable instructions, or use a combination of hardware and machine-readable instructions to perform the illustrated processes.

Figure 4:
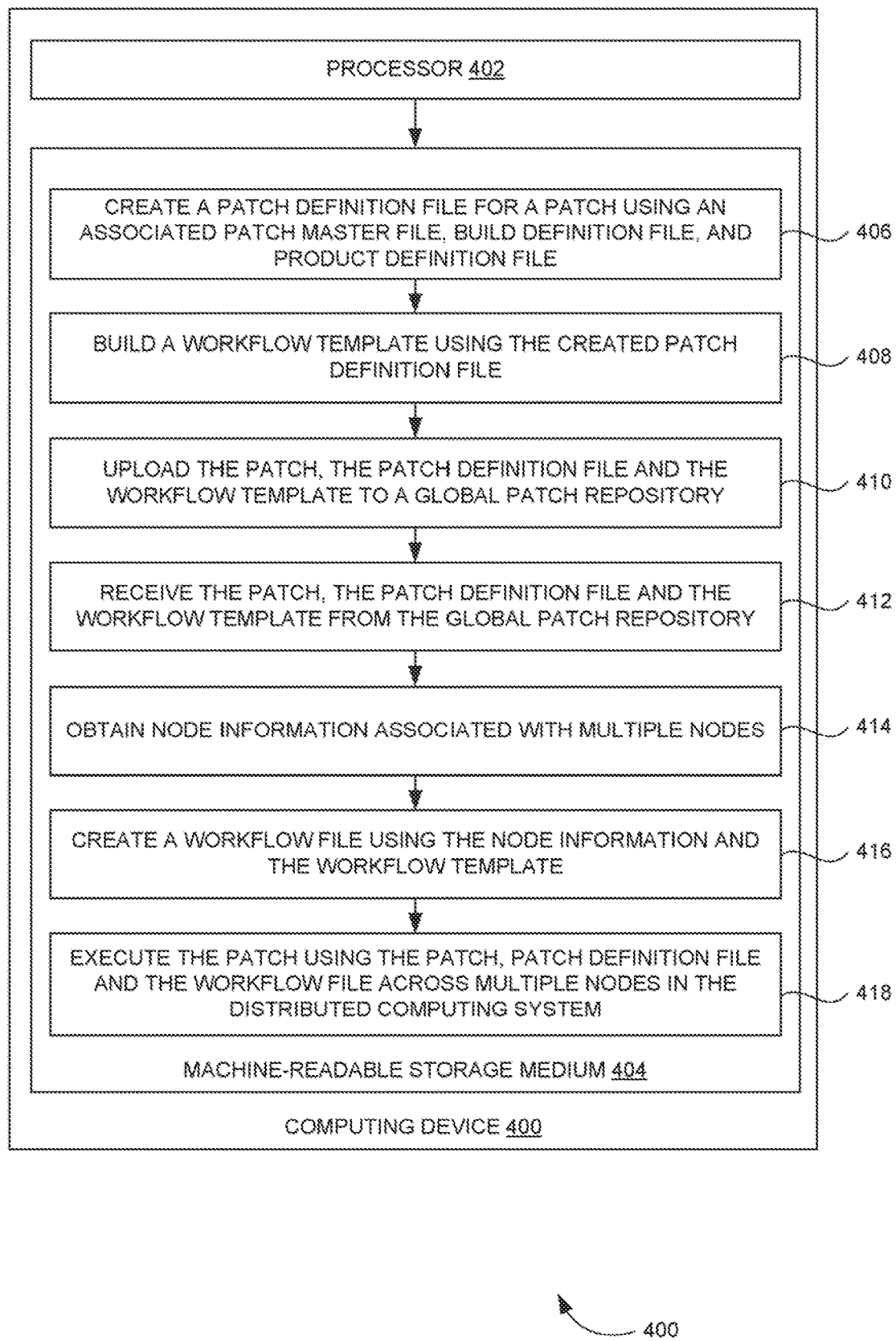
FIG. 4 is a block diagram of an example computing device including non-transitory machine-readable storage medium storing instructions to cause patching in a distributed computing system.

FIG. 4 is a block diagram of an example computing device 400 including a non-transitory machine-readable storage medium on which is stored instructions for patching in a distributed computing system. In an example, computing device 400 may include a virtualization layer that supports execution of the cloud power optimization.

Further, computing device 400 may include a processor 402 and machine-readable storage medium 404 communicatively coupled through a system bus. Processor 402 may be any type of central processing unit (CPU), microprocessor, or processing logic that interprets and executes machine-readable instructions stored in machine-readable storage medium 404. Machine-readable storage medium 404 may be a random-access memory (RAM) or another type of dynamic storage device that may store information and machine-readable instructions for execution by processor 402. For example, machine-readable storage medium 304 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 404 may be a non-transitory machine-readable medium. In an example, machine-readable storage medium 404 may be remote but accessible to computing device 400.

Machine-readable storage medium 404 may store instructions 406-412. In an example, instructions 406-412 may be executed by processor 402 to assist in patching in a distributed computing system 190 (shown in FIG. 1). Instructions 406 may be executed by processor 402 to create a patch definition file for a patch using an associated patch master file, a build definition file, and a product definition file. Instructions 408 may be executed by processor 402 to build a workflow template using the created patch definition file. In an example, the patch master file includes default patches and their associated identification (id) information and checksums. Further in an example, the build definition file comprises selected patches from the master file, wherein the selected patches comprise binary information, and wherein the binary information is metadata. Furthermore, in an example, the product definition file comprises binary information that defines the software component and associated artifacts, and wherein the production definition file further comprises a list of permitted actions that can be performed on the artifacts.

Instructions 410 may be executed by processor 402 to build a workflow template using the created patch definition file. Instructions 410 may be executed by processor 402 to upload the patch, the patch definition file, and the workflow template to a global patch repository.

Instructions 412 may be executed by processor 402 to receive the patch, the patch definition file, and the workflow template from the global patch repository. Instructions 414 may be executed by processor 402, to obtain node information associated with multiple nodes in the distributed computed system, Instructions 416 may be executed by processor 402 to create a workflow file using node information and the workflow template. Instructions 418 may be executed by processor 402 to execute the patch using the patch, the patch definition file, and the workflow file across multiple nodes in the distributed computing system.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A system comprising:
  a distributed computing system, wherein the distributed computing system comprises:
    a software application, wherein the software application comprises multiple software components; and
    multiple nodes, wherein at least one of the multiple nodes comprises a processor configured to implement the software application, each software component is running on any one or more of the nodes;
  a patch execution server communicatively coupled to the distributed computing system, wherein the patch execution server comprises:
    a structured patch execution module, wherein the structured patch execution module is to:
      receive an uploaded patch, a patch definition file and a workflow template from a global patch repository, wherein the patch definition file for the patch is created using an associated patch master file, an associated build definition file, and an associated product definition file, and wherein the workflow template is created using the patch definition file and the patch;

create a workflow file using node information associated with the multiple nodes and the workflow template; and execute the patch, using the patch, the patch definition file and the workflow file, across the multiple nodes in the distributed computing system.

2. The system of claim 1, further comprising:
a patch creation server, wherein the patch creation server comprises:
 a structured patch creation module for creating the patch definition file for a patch using the patch's associated patch master file, associated build definition file, and associated product definition file;
a patch build server, wherein the patch build server is communicatively coupled to the structured patch creation module, wherein the patch build server, the global patch repository and the patch execution server are coupled via a network, wherein the patch build server comprises:
 a structured patch build module, wherein the structured patch build module is to:
  build the workflow template based on the created patch definition file and the patch; and
  upload the patch, the created patch definition file and the workflow template on to the global patch repository.

3. The system of claim 1, wherein the multiple nodes are selected from the group consisting of mainframes, personal computers, workstations, minicomputers, virtual machines (VMs), and/or containers.

4. The system of claim 1, wherein the patch master file comprises default patches and their associated identification (id) information and checksums.

5. The system of claim 1, wherein the build definition file comprises selected patches from the patch master file, wherein the selected patches comprise binary information, and wherein the binary information is metadata.

6. The system of claim 5, wherein the metadata comprises product name, version, date a software component was created, and/or patch identification (ID).

7. The system of claim 1, wherein the product definition file comprises binary information that defines a software component and associated artifacts, and wherein the product definition file further comprises a list of permitted actions that can be performed on the artifacts.

8. The system of claim 1, wherein the patch definition file defines the software components and artifacts associated with the patch.

9. The system of claim 1, further comprising a system resource management tool, and wherein the system resource management tool obtains multi-vendor inventory information, wherein the multi-vendor inventory information includes node information comprising details of how the multiple nodes are coupled and how the software components are running on the multiple nodes.

10. A non-transitory computer-readable storage medium storing instructions executable by a computing device having a patch system, to cause the patch system to:
create a patch definition file for a patch using an associated patch master file, a build definition file, and a product definition file;
build a workflow template using the created patch definition file;
upload the patch, the patch definition file and the workflow template to a global patch repository;
receive the patch, the patch definition file and the workflow template from the global patch repository;
obtain node information associated with multiple nodes in a distributed computing system; and
create a workflow file using the node information and the workflow template; and
execute the patch using the patch, the patch definition file, and the workflow file across the multiple nodes in the distributed computing system.

11. The non-transitory computer-readable storage medium of claim 10, wherein the multiple nodes are selected from the group consisting of mainframes, personal computers, workstations, minicomputers, virtual machines (VMs), and/or containers.

12. The non-transitory computer-readable storage medium of claim 10, wherein the patch master file comprises default patches and their associated identification (id) information and checksums.

13. The non-transitory computer-readable medium of claim 10, wherein the build definition file comprises selected patches from the patch master file, wherein the selected patches comprise binary information, and wherein the binary information is metadata.

14. The non-transitory computer-readable medium of claim 10, wherein the product definition file comprises binary information that defines a software component and associated artifacts, and wherein the product definition file further comprises a list of permitted actions that can be performed on the artifacts.

15. A method for patching in a distributed computing system, the method comprising:
receiving a patch, a patch definition file and a workflow template from a global patch repository for execution on multiple nodes in the distributed computing system;
obtain node information associated with the multiple nodes in the distributed computing system;
creating a workflow file using the node information associated with the multiple nodes and the workflow template; and
executing the patch using the patch, the patch definition file, and the workflow file across the multiple nodes in the distributed computing system;
wherein the method further comprises creating the patch definition file for the patch using an associated patch master file, a build definition file, and a product definition file for executing the patch across the multiple nodes in the distributed computing system.

16. The method of claim 15, further comprising:
building a workflow template using the created patch definition file; and
uploading the patch, the patch definition file, and the workflow template to the global patch repository.

17. The method of claim 15, wherein the multiple nodes are selected from the group consisting of mainframes, personal computers, workstations, minicomputers, virtual machines (VMs), and/or containers.

18. The method of claim 15, wherein the patch master file comprises default patches and their associated identification (id) information and checksums.

19. The method of claim 15, wherein the build definition file comprises selected patches, for the patch to be executed across multiple nodes, from the patch master file, wherein the selected patches comprise binary information, and wherein the binary information is metadata.

20. The method of claim 15, wherein the product definition file comprises binary information that defines a software component and associated artifacts, and wherein the product definition file further comprises a list of permitted actions that can be performed on the artifacts.

21. The method of claim 15, wherein the patch definition file defines the software components and artifacts associated with the patch.

* * * * *